July 6, 1954          J. MORKOSKI          2,682,819
HITCH CONSTRUCTION FOR TRACTOR IMPLEMENTS
Filed June 20, 1951                        2 Sheets-Sheet 1
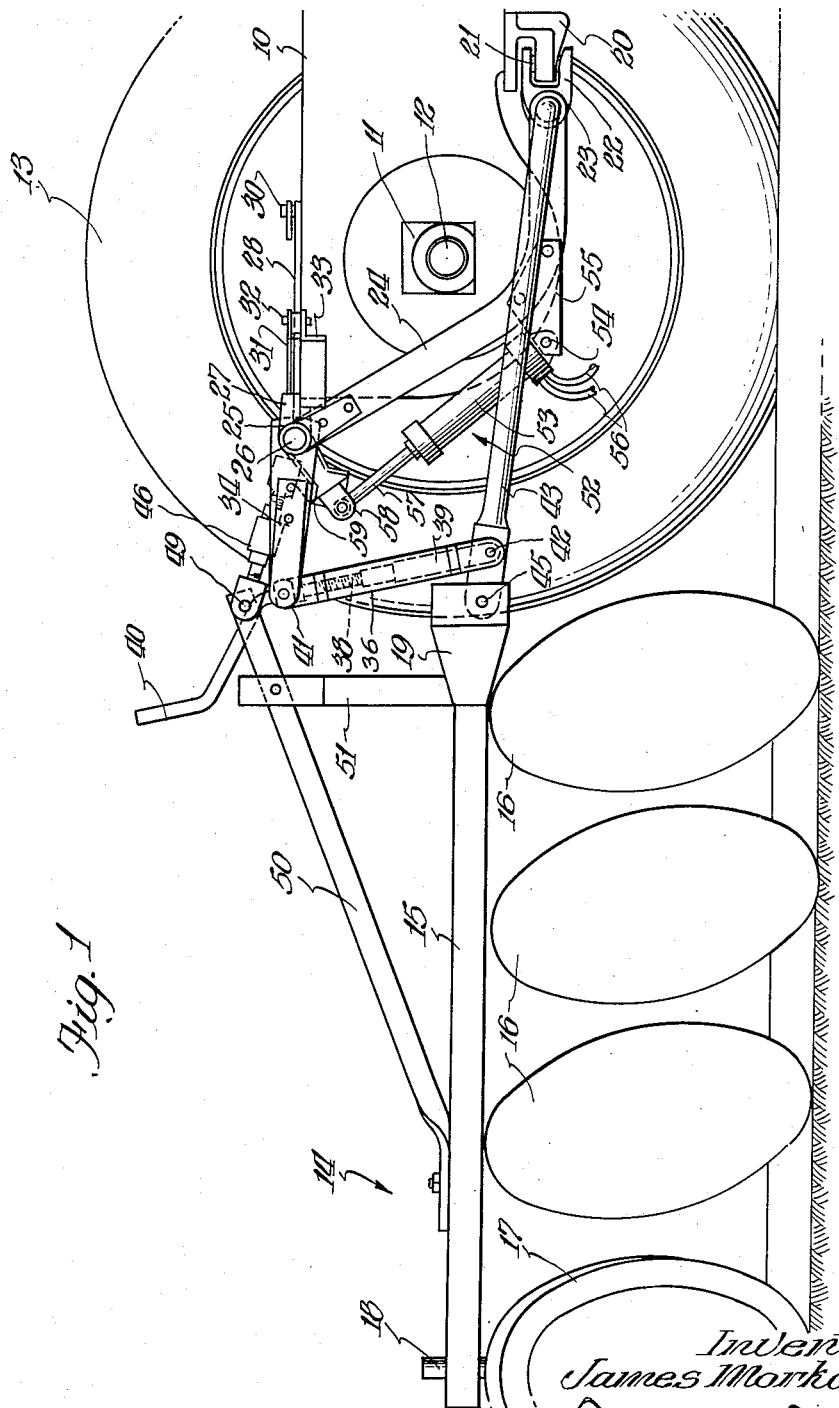
Inventor:
James Morkoski
By: Paul O. Pippel
Attorney.

July 6, 1954 J. MORKOSKI 2,682,819
HITCH CONSTRUCTION FOR TRACTOR IMPLEMENTS
Filed June 20, 1951 2 Sheets-Sheet 2
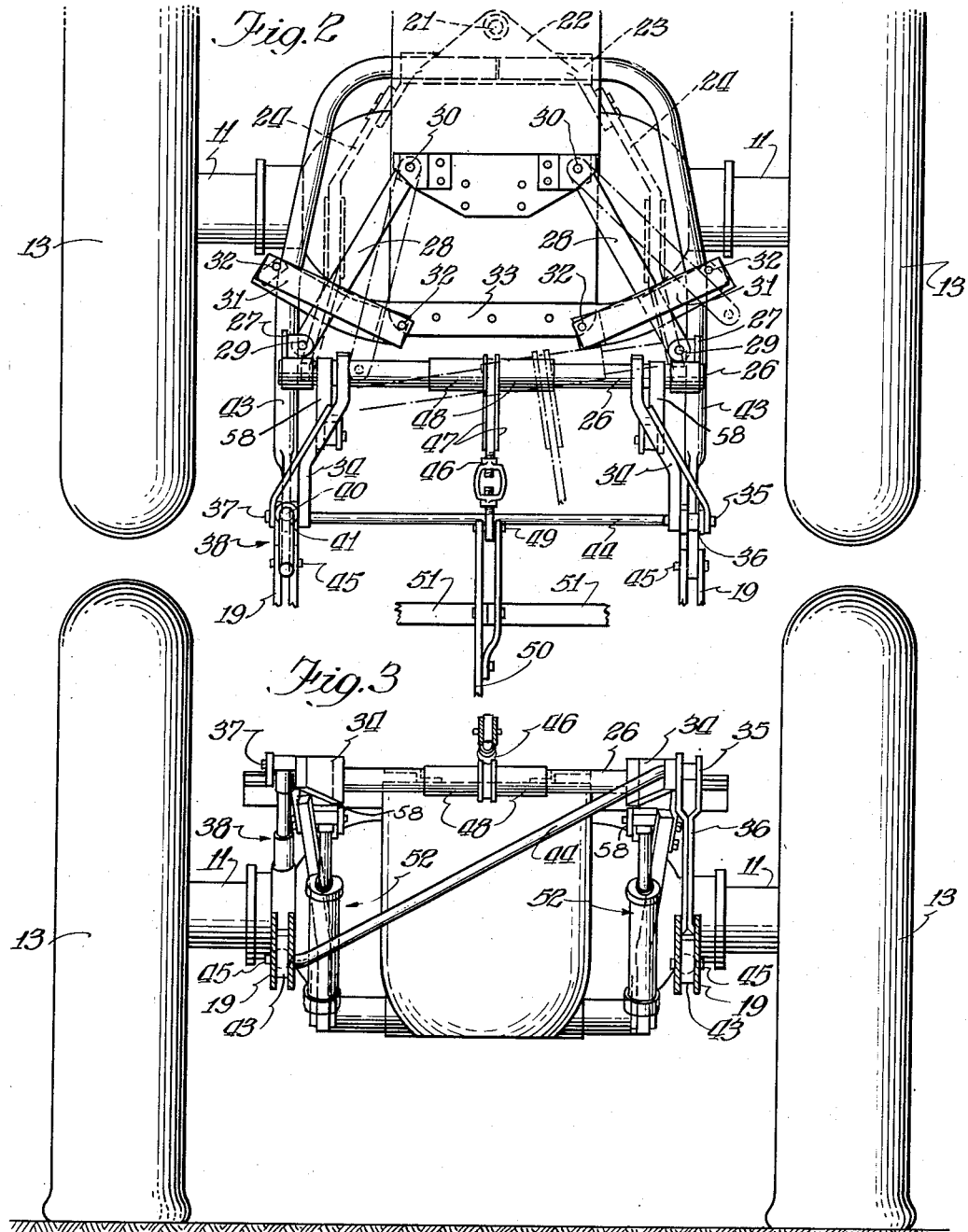
Inventor:
James Morkoski
By: Paul O. Pippel
Attorney.

Patented July 6, 1954

2,682,819

UNITED STATES PATENT OFFICE 2,682,819

HITCH CONSTRUCTION FOR TRACTOR IMPLEMENTS

James Morkoski, Memphis, Tenn., assignor to International Harvester Company, a corporation of New Jersey Application June 20, 1951, Serial No. 232,513

8 Claims. (Cl. 97—46.59)

This invention relates to agricultural implements and particularly to tractor-mounted implements. More specifically the invention concerns novel attaching means for mounting an implement of the direct-connected type upon a tractor.

The invention is to be described in its application to an implement connected to the rear of a tractor by a so-called "three-point suspension" system. By such a system a pair of laterally spaced connecting points are provided on the implement and pivotally connected to the tractor by linkage accommodating lateral swinging of the implement relative to the tractor. A third connecting point on the implement above and between the lower points is connected to the tractor by a link which does not participate to the same extent as the lower links in the lateral swinging of the implement. Damage to the connecting linkage and to the implement often occurs due to the strains to which they are subjected in operating the implement.

An object of this invention is the provision of improved mechanism for mounting an implement upon a tractor to be supported therefrom in transport.

Another object of the invention is to provide improved means for directly connecting an implement to a tractor whereby the implement and the tractor mounting members are subjected to minimum stress upon lateral swinging of the implement relative to the tractor.

Another object of the invention is to provide an improved mounting unit for attaching an implement to a tractor for lateral swinging relative thereto, wherein the mounting unit incorporates lifting mechanism which swings with the implement.

Other objects and advantages of the invention will become clear from the following detailed description when read in conjunction with the accompanying drawings wherein:

Fig. 1 is a view in side elevation of the rear end of a tractor showing an implement in the form of a disk plow attached thereto by novel mechanism incorporating the features of the invention;

Fig. 2 is a plan view of the implement attaching structure shown in Fig. 1 and showing only a fragment of the implement; and Fig. 3 is a rear elevation thereof, partly in section, of the structure shown in Fig. 2.

Referring to the drawings, the numeral 10 designates the longitudinally extending body of a tractor having a power plant incorporated therein and having a transversely extending rear axle structure 11 at each side of the tractor body carrying a rear axle 12 supporting transversely spaced rear drive wheels 13. The tractor has attached thereto for transport thereupon, when not in operation, an agricultural implement in the form of a disk plow generally designated by the numeral 14 and comprising generally a longitudinally extending frame 15, earth working disks 16, and a rear furrow wheel 17 mounted upon a spindle 18 carried by the frame.

The implement 14 has forward transversely spaced hitch portions 19 and is adapted for attachment to the tractor by the so-called three-point suspension system. By this system three points of attachment are provided on the implement so that it can be carried properly on the tractor, two of the points being laterally spaced in substantially horizontal alignment and the third attaching point being vertically spaced above and between the laterally spaced points in the form of a triangle. The implement is connected to the tractor to be controlled therefrom and to be raised thereon for transport purposes by tractor attaching mechanism now to be described.

To the lower portion of the tractor body in advance of the rear axle structure between the laterally spaced drive wheels, there is provided an attaching member 20 having mounted thereon a vertical pivot pin 21 to which is pivotally attached the forward bifurcated end of a triangularly shaped hitch member 22 having a transversely extending bearing portion 23. A pair of bars 24 are secured to the hitch member 22, as indicated clearly in Fig. 2, and extend rearwardly therefrom on opposite sides of the tractor body 10. These arms extend rearwardly beyond the rear axle structure 11 and their rear ends are bent upwardly as indicated in Fig. 1. The upper rear end of each arm 24 is provided with a bearing portion 25 adapted to rotatably receive the ends of a transversely extending rock shaft 26 which extends across the rear of the tractor and is also provided at each end with a lug 27 to which the rear end of a link 28 is pivotally connected by means of a pin 29. These two links 28 converge forwardly and are pivotally connected at laterally spaced locations at 30 to the upper portion of the tractor body 10. These links 28 rest upon the body of the tractor and adjacent their rear ends are confined between plates 31 secured at opposite sides of the tractor body by bolts 32 to an arcuately shaped bar 33 affixed to the tractor body. For reasons that will become clear hereinafter, these links 28 are capable of lateral swinging about their pivots 30 and are confined between the plates 31 and the bar 33. Swinging of these links laterally is limited by the bolts 32 which secure the plates to the bar 33.

Mounted upon the transverse rock shaft 26 for rotation with respect thereto are a pair of laterally spaced arms 34 which are bifurcated at their rear ends as indicated in Fig. 2. The right-hand arm 34 has mounted in its bifurcated rear end a pivot pin 35 and upon this pin is pivotally mounted a vertically extending lift arm 36. The left-hand arm 34 has likewise mounted therein a pivot pin 37 upon which is pivotally mounted a vertically extending lift link 38 in the form of an adjustable member comprising a sleeve 39 and a crank 40 having a threaded portion receivable in the threaded interior of sleeve 39. The pivot pin 37 passes through the lift arm 34 and a swivel 41 in which the crank is received.

The lower ends of the lift links 36 and 38 are pivotally connected by pins 42 with the rear ends of a pair of laterally spaced parallel links 43. Each of the links 43 extends forwardly on each side of the tractor body and is bent inwardly at its forward end for reception in opposite ends of the bearing portion 23 of the hitch 22 for rotating movement therein. The links 43 and member 22 thus function as a draft member for transmitting draft from the tractor to the implement. The links 43 are therefore capable of vertical swinging movement about the bearing portion 23 as an axis. The pivot pin 35 carried by the right-hand lift arm 34 is the outwardly bent end of a diagonally extending brace 44, the other end of which is connected to the rear end of the left-hand link 43.

These parallel links 43 serve as attaching members for connecting the implement 14 to the tractor, and as clearly seen in the drawing these links are pivotally connected with the hitch members 19 at laterally spaced locations by pins 45. A third connection is made to the implement by means of a link 46 in the form of a turnbuckle secured to a pair of lugs 47 extending rearwardly from a pair of sleeves 48 rotatably mounted upon the transverse rock shaft 26. The rear end of the upper link 46, which is substantially parallel to the lower links 43, is pivotally connected by a pin 49 with the bifurcated forward end of a longitudinally extending brace 50 secured at its rear end to the plow frame 15. Brace 50 extends forwardly and upwardly at an angle from the plow frame and is supported upon a pair of upwardly converging straps 51 which are secured to the plow frame 15 at laterally spaced locations thereon. It should be clear at this point that the implement 14 is connected to the tractor at laterally and vertically spaced locations defining a triangle. It should also be clear that the implement is capable of vertical floating movement by virtue of the pivotal connection of the links 43 and 46 with the tractor.

Raising and lowering of the implement with respect to the tractor to move it vertically between operating and transport positions is accomplished by power transmission mechanism including a ram unit designated at 52 and comprising a cylinder 53 anchored upon a pivot pin 54 carried by a pair of plates 55 secured to each of the arms 24, a ram unit 52 being thus provided at each side of the tractor body in association with each of the arms 24. Hydraulic fluid is supplied to the cylinder 53 through hose lines 56 from a source of power on the tractor, not shown. Slidably receivable in the cylinder 53 is a piston rod 57 which is connected to an arm 58 affixed to the transverse rock shaft 26 at one end thereof. A similar arm 58 is provided at each end of the rock shaft 26 for connection of the associated ram unit 52 therewith, although a description of one will suffice for both. Each arm 58 is further provided with a projection 59 which upon operation of the ram unit 52 and rocking of the shaft 26 in a clockwise direction as viewed in Fig. 1, engages the associated lift arm 34, and upon extension of the piston rod 57 in the cylinder the arms 34 will be rocked in a clockwise direction to lift the implement to a transport position. Similarly, upon retraction of the piston rod in the cylinder 53 the implement will be lowered to its operating position. Upon further collapse of the piston and cylinder, the arm 58 moves away from the lift arm 34 on each side of the tractor body to provide a space therebetween and accommodate vertical floating movement of the implement relative to the tractor in operation.

Leveling of the implement with respect to the tractor is accomplished by manipulation of the crank 40 to shorten or lengthen the lift arm 38. Likewise, adjustment of the pitch of the implement to make minor adjustments in the depth of operation is accomplished by shortening or lengthening the upper turnbuckle link 46.

As will be clear from the foregoing description, the rock shaft 26 is not stationary but is capable of lateral swinging movement by virtue of its being supported upon the rear ends of the forwardly converging links 28. The rock shaft 26 therefore swings laterally with the links 28 within the limits defined by the bolts 32 to accommodate the lateral swinging of the implement relative to the tractor so that the implement can follow in the path of the tractor. Furthermore, the strain which would be placed upon linkages such as the link 46, were the rock shaft 26 stationary, is avoided because the link 46 also swings with the link and with the rock shaft. The swinging of the rock shaft and the other tractor attaching structure including the links 43 and 46, arms 24, and rams 52 as well as the implement itself, is about the axis of pivot pin 21. As will be clear from a study of Fig. 2, the links 28 converge at a point near the axis of pin 21 to facilitate the lateral swinging of all parts of the attaching structure. It should be understood, of course, that this point of convergence does not coincide with the axis of pin 21 throughout the range of lateral swinging of the links 28, but only approximately. In fact this point of convergence varies during said lateral swinging. However, the links 28 serve as supports for the attaching structure, and their convergence is so near the axis of pin 21 that the parts connected thereto participate in the lateral swinging without distortion. The entire implement and attaching structure thus swings about an axis on the tractor well in advance of the rear axle structure. Applicant has found that optimum draft conditions prevail by connecting the implement to the tractor in draft receiving relation at a location in advance of the rear axle of the tractor.

The operation of the tractor attaching structure of the present invention should be clearly understood from the foregoing description. It should be understood, however, that modifications may be made in the construction and arrangement of parts without departing from the spirit of the invention or the scope thereof as defined by the appended claims.

I claim:

1. Attaching mechanism for connecting an implement to the rear of a tractor having a transverse rear axle structure and spaced drive wheels thereon, comprising a hitch member connected to the tractor for lateral swinging movement and extending rearwardly therefrom, standards mounted on said hitch member and a transverse rock shaft carried by said standards and forming an attaching unit with the hitch member for lateral swinging movement therewith, power transmission mechanism carried by said unit, a lifting connection between said rock shaft and the implement, an operating connection between the power transmission mechanism and said rock shaft for rocking the latter to raise and lower the implement, and guide means on the tractor operatively connected to said attaching unit to maintain the vertical position thereof with respect to the tractor while accommodating lateral swinging of the unit relative to the tractor.

2. Attaching mechanism for connecting an implement to the rear of a tractor having a transverse rear axle structure and spaced drive wheels thereon, comprising a hitch member connected to the tractor for lateral swinging movement about a vertical pivot and extending rearwardly therefrom, a pair of laterally spaced, forwardly converging links vertically above said hitch member and pivoted to the tractor for lateral swinging about laterally spaced vertical pivots, the convergence of said links being approximately on the same vertical axis as the pivot of said hitch member, a transverse rock shaft carried by said hitch member and said links as a unit and swingable therewith, power transmission mechanism carried by the unit and operatively connected to said shaft for rocking the latter to raise and lower the implement, and a lifting connection between the shaft and the implement.

3. Attaching mechanism for connecting an implement to the rear of a tractor having a transverse rear axle structure and drive wheels thereon, comprising a pair of laterally spaced forwardly converging links connected to the tractor for lateral swinging relative thereto and held against vertical movement with respect to the tractor, a transverse rock shaft pivotally carried at the rear ends of said links for lateral swinging therewith, a draft member spaced vertically below said links and connected to the tractor for lateral swinging as a unit relative thereto, power transmission mechanism carried by the unit and operatively connected to said shaft for rocking the latter to raise and lower the implement, a lifting connection between said rock shaft and said draft member for raising and lowering the latter upon rocking the shaft, a draft connection between said member and the implement, and another draft connection between the rock shaft and the implement.

4. Attaching mechanism for connecting an implement to the rear of a tractor having a transverse rear axle structure and drive wheels thereon, comprising a pair of laterally spaced forwardly converging links connected to the tractor for lateral swinging relative thereto and held against vertical movement with respect to the tractor, a transverse rock shaft pivotally carried at the rear ends of said links for lateral swinging therewith, a draft member spaced vertically below said links and connected to the tractor for lateral swinging relative thereto as a unit about an axis approximately vertically below the convergence of said upper links, power transmission mechanism carried by the unit and operatively connected to said shaft for rocking the latter to raise and lower the implement, a lifting connection between said rock shaft and said draft member for raising and lowering the latter upon rocking said shaft, a draft connection between said member and the implement, and a draft link connecting the rock shaft to the implement at a location vertically spaced above the connection of said draft member thereto.

5. Attaching mechanism for connecting an implement to the rear of a tractor having a transverse rear axle structure and drive wheels thereon, comprising a pair of laterally spaced forwardly converging links connected to the tractor for lateral swinging relative thereto and held against vertical movement with respect to the tractor, a transverse rock shaft pivotally carried at the rear ends of said links for lateral swinging therewith, a draft member spaced vertically below said links and connected to the tractor for lateral swinging relative thereto as a unit about an axis approximately vertically below the convergence of said upper links, power transmission mechanism carried by the unit and operatively connected to said shaft for rocking the latter to raise and lower the implement, a lifting connection between said rock shaft and said draft member for raising and lowering the latter upon rocking said shaft, a draft connection between said member and the implement, a draft link connecting the rock shaft to the implement at a location vertically spaced above the connection of said draft member thereto and guide means on the tractor for confining and guiding said converging links throughout their range of lateral swinging movement, including stop means limiting the swinging thereof.

6. Attaching mechanism for connecting an implement to the rear of a tractor having a transverse rear axle structure and drive wheels thereon, comprising laterally spaced rearwardly extending links pivotally connected to the tractor on laterally spaced pivots above the body of the tractor for lateral swinging relative thereto, guide means on the tractor for holding said links against vertical movement and guiding them during swinging thereof, laterally spaced draft links extending rearwardly from the tractor and connected thereto for lateral swinging about a pivot below the body of the tractor, a transverse rock shaft carried by the upper pair of said links, power transmission mechanism carried by said links and operatively connected to said shaft for rocking the latter to raise and lower the implement, means connecting the draft links to the implement, and lifting connections between the rock shaft and the implement for lifting the latter upon rocking the shaft.

7. Attaching mechanism for connecting an implement to the rear of a tractor having a transverse rear axle structure and drive wheels thereon, comprising laterally spaced rearwardly extending links pivotally connected to the tractor on laterally spaced pivots above the body of the tractor for lateral swinging relative thereto, guide means on the tractor for holding said links against vertical movement and guiding them during swinging thereof, laterally spaced draft links extending rearwardly from the tractor and connected thereto for lateral swinging about a pivot below the body of the tractor, a transverse rock shaft carried by the upper pair of said links, power transmission mechanism carried by said links and operatively connected to said shaft for rocking the latter to raise and lower the implement, means connecting the draft links to the implement, another link mounted on the rock shaft and swingable therewith relative to the tractor, and a draft connection between the last-mentioned link and the implement at a location vertically spaced from the connection of said pair of draft links thereto.

8. Attaching mechanism for connecting an implement to the rear of a tractor having a transverse rear axle structure and drive wheels thereon, comprising a pair of laterally spaced forwardly converging links connected to the tractor for lateral swinging relative thereto and held against vertical movement with respect to the tractor, rockable means carried at the rear ends of said links for lateral swinging therewith, an operating connection between said power transmission mechanism and said rockable means for rocking the latter, a draft connection between said rockable means and the implement, a draft member connecting the implement to the tractor on a pivot spaced vertically below and approximately on a line with the convergence of said links throughout the range of lateral swinging thereof, and a lifting connection between the rockable means and the implement for raising and lowering the latter upon rocking of the rockable means.

References Cited in the file of this patent
UNITED STATES PATENTS

| Number | Name | Date |
|---|---|---|
| 1,663,249 | Graham et al. | Mar. 20, 1928 |
| 2,330,743 | Rasmussen et al. | Sept. 28, 1943 |
| 2,394,210 | Sherman | Feb. 5, 1946 |
| 2,403,360 | Graham | July 2, 1946 |
| 2,430,732 | Orelind et al. | Nov. 11, 1947 |
| 2,518,360 | Morkoski | Aug. 8, 1950 |
| 2,521,503 | Clark | Sept. 5, 1950 |
| 2,533,521 | Silver | Dec. 12, 1950 |